(12) United States Patent
Ruediger et al.

(10) Patent No.: US 6,893,613 B2
(45) Date of Patent: May 17, 2005

(54) PARALLEL CHEMISTRY REACTOR WITH INTERCHANGEABLE VESSEL CARRYING INSERTS

(75) Inventors: Walter Ruediger, New Hope, PA (US); A. Erik Rubin, Plainsboro, NJ (US); Alexander Bertok, Edison, NJ (US); Victor W. Rosso, East Windsor, NJ (US); Joseph Nolfo, Hawthorne, NJ (US); Harold N. Weller, Pennington, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

(21) Appl. No.: 10/057,451

(22) Filed: Jan. 25, 2002

(65) Prior Publication Data

US 2003/0143120 A1 Jul. 31, 2003

(51) Int. Cl.$^7$ .................................................. B01L 9/00
(52) U.S. Cl. ........................ 422/104; 422/99; 422/102; 422/129; 422/130; 422/131
(58) Field of Search .................... 422/99–104, 129–131

(56) References Cited

U.S. PATENT DOCUMENTS

| 4,938,369 A | * | 7/1990 | Carilli | 211/74 |
| 5,061,630 A | * | 10/1991 | Knopf et al. | 422/99 |
| 5,270,010 A | * | 12/1993 | Lautenschlager | 422/102 |

(Continued)

FOREIGN PATENT DOCUMENTS

| JP | 01180435 A | * | 7/1989 | G01N/1/28 |
| WO | WO 97/10896 | * | 3/1997 | |

OTHER PUBLICATIONS

Sargent–Welch, Catalog 130, 1984.*
Automated Chemical Synthesis by Brian G. Main and David A. Rudge.
Design, Construction & Application of a Fully Automated Equimolar, etc.
Computer–assisted automatic synthesis II. Development of a fully, etc.
The DiversomerTM Approach: Integration & Automation of Multiple, etc.
Automated Combinatorial Chemistry on Solid Phase by Cargill & Maiefski.
Stem Reactino Blocks by Cole–Parmer Instrument Company (12 pages).

*Primary Examiner*—Jill Warden
*Assistant Examiner*—Dwayne K Handy
(74) *Attorney, Agent, or Firm*—Robert L. Epstein; Epstein Drangel Bazerman & James, LLP

(57) ABSTRACT

The base of the modular reactor includes a frame which defines an opening into which one of a plurality of interchangeable reaction vessel carrying inserts can be removeably received. Each insert has an array of recesses adapted to receive a different number of reaction vessels of different sizes. The recesses are positioned such that all arrays are suitable for use with a standard automated liquid handler. The frame has fluid flow channels for regulating the temperature of the lower portions of the vessels. A temperature control module can be received over the base to regulate the temperature of the upper portions of the vessels for reflux reactions. The corner radii of the insert and frame opening cooperate to permit the insert to be received in the frame in only one orientation. The walls of the insert are inclined to facilitate removal by a friction fit tool. Each vessel receiving recess has a self-centering conical or semi-circular shaped bottom to maximize heat transfer and distribute the load uniformly. The vessels seat as close to the bottom surface of the base as possible to facilitate use with an air driven magnetic stirrer. A thin, electrically heated plate may be received between the base and the stirrer.

37 Claims, 11 Drawing Sheets

U.S. PATENT DOCUMENTS

| | | | | |
|---|---|---|---|---|
| 5,601,141 A | * | 2/1997 | Gordon et al. | 165/263 |
| 5,609,826 A | * | 3/1997 | Cargill et al. | 422/99 |
| 5,681,492 A | * | 10/1997 | Van Praet | 219/400 |
| 5,716,584 A | * | 2/1998 | Baker et al. | 422/131 |
| 5,741,463 A | * | 4/1998 | Sanadi | 422/101 |
| 5,762,881 A | * | 6/1998 | Harness et al. | 422/132 |
| 5,866,342 A | * | 2/1999 | Antonenko et al. | 435/7.1 |
| 5,961,925 A | * | 10/1999 | Ruediger et al. | 422/99 |
| 5,976,470 A | | 11/1999 | Maiefski et al. | |
| 6,054,100 A | * | 4/2000 | Stanchfield et al. | 422/102 |
| 6,126,904 A | * | 10/2000 | Zuellig et al. | 422/130 |
| 6,153,426 A | * | 11/2000 | Heimberg | 435/287.2 |
| 6,159,368 A | * | 12/2000 | Moring et al. | 210/321.75 |
| 6,171,780 B1 | * | 1/2001 | Pham et al. | 435/4 |
| 6,258,323 B1 | * | 7/2001 | Hormann et al. | 422/99 |
| 6,274,094 B1 | | 8/2001 | Weller, III et al. | |
| 6,306,658 B1 | * | 10/2001 | Turner et al. | 436/37 |
| 6,309,889 B1 | * | 10/2001 | Cutler et al. | 436/165 |
| 6,357,141 B1 | * | 3/2002 | Kearsley et al. | 34/305 |
| 6,372,185 B1 | * | 4/2002 | Shumate et al. | 422/100 |
| 6,416,719 B1 | * | 7/2002 | Fawcett et al. | 422/104 |
| 6,558,632 B1 | * | 5/2003 | Guller et al. | 422/104 |
| 6,657,169 B2 | * | 12/2003 | Brown | 219/476 |
| 6,682,703 B2 | * | 1/2004 | Burow et al. | 422/102 |

* cited by examiner

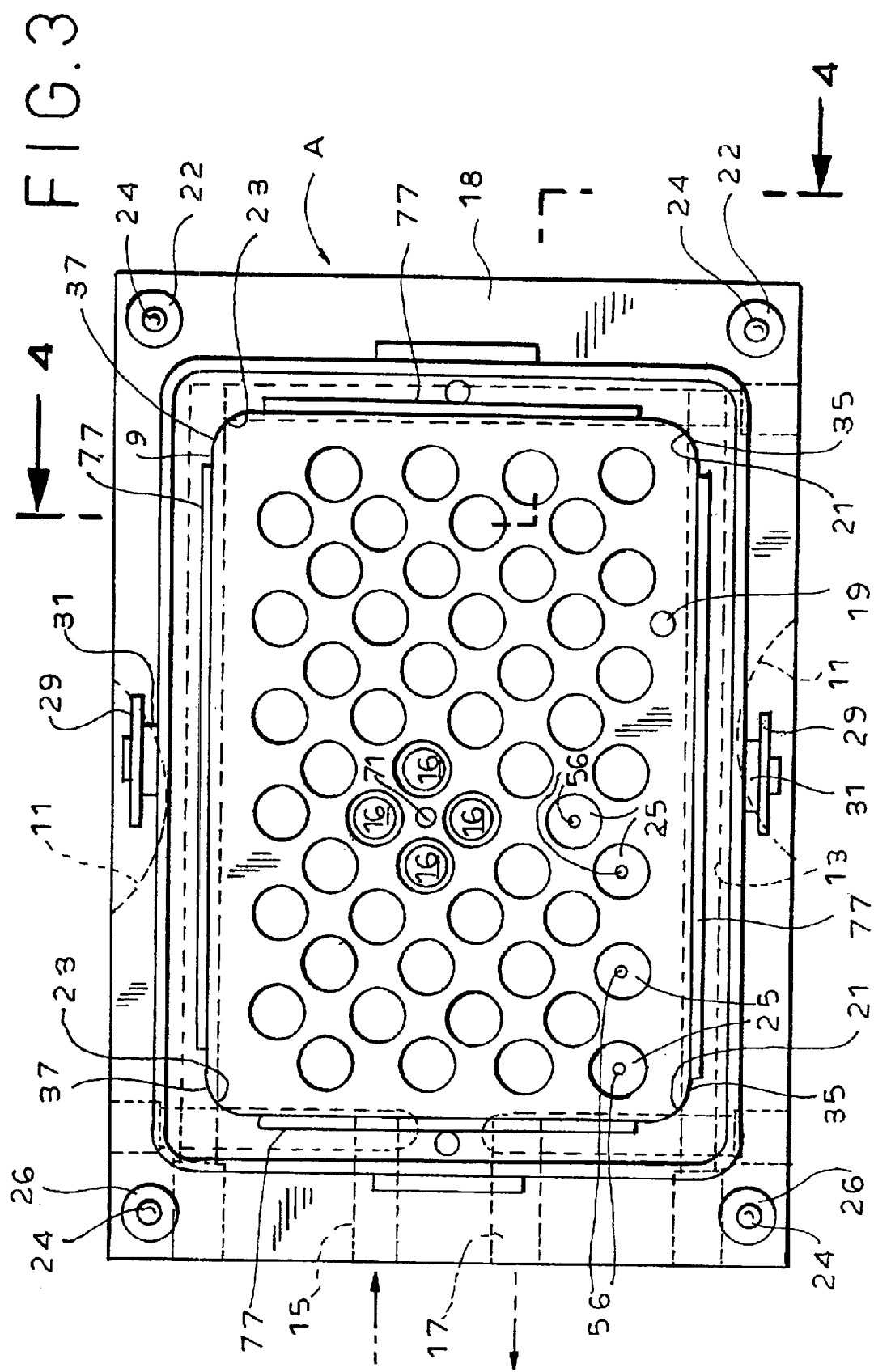

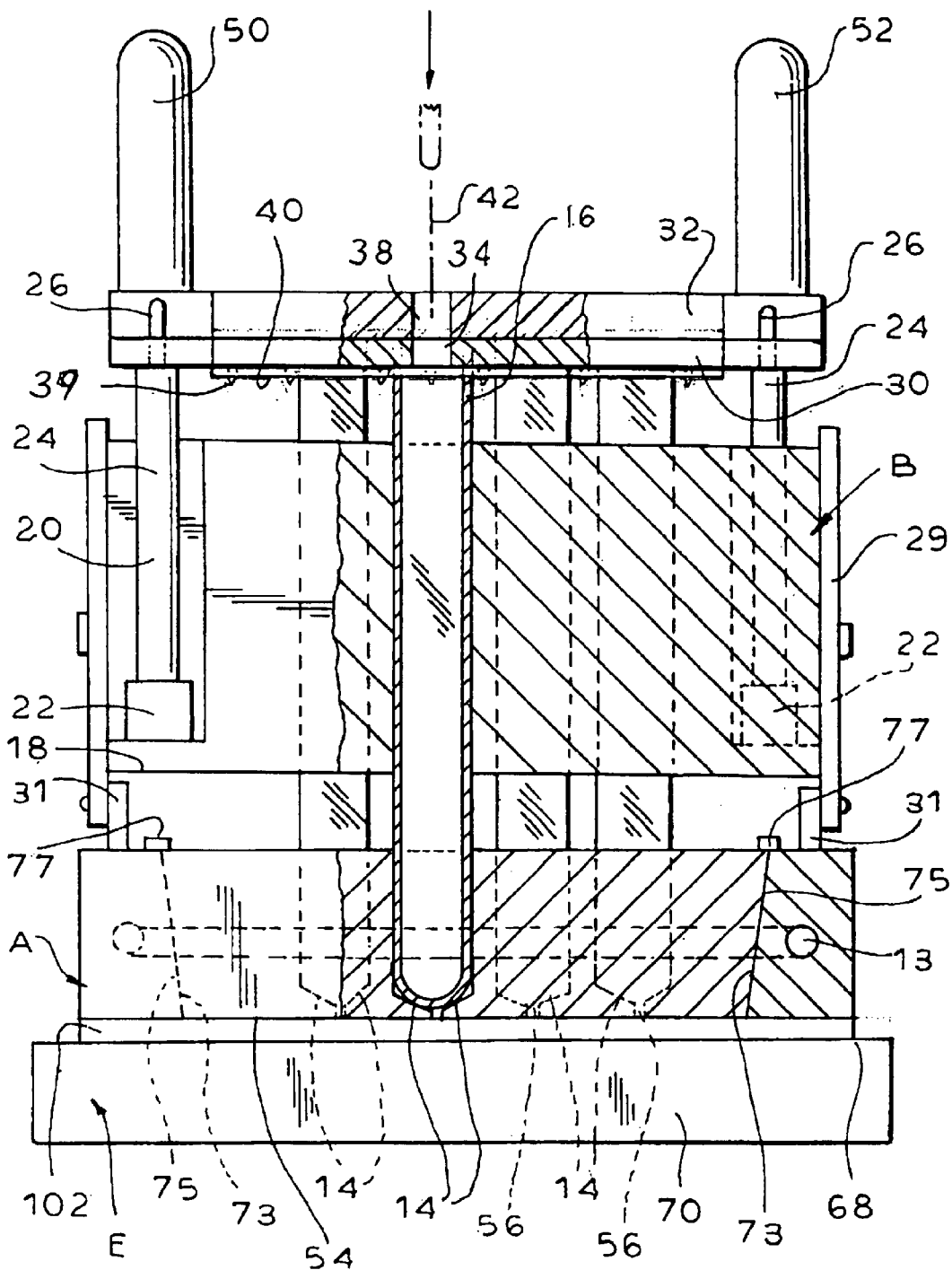

FIG.13
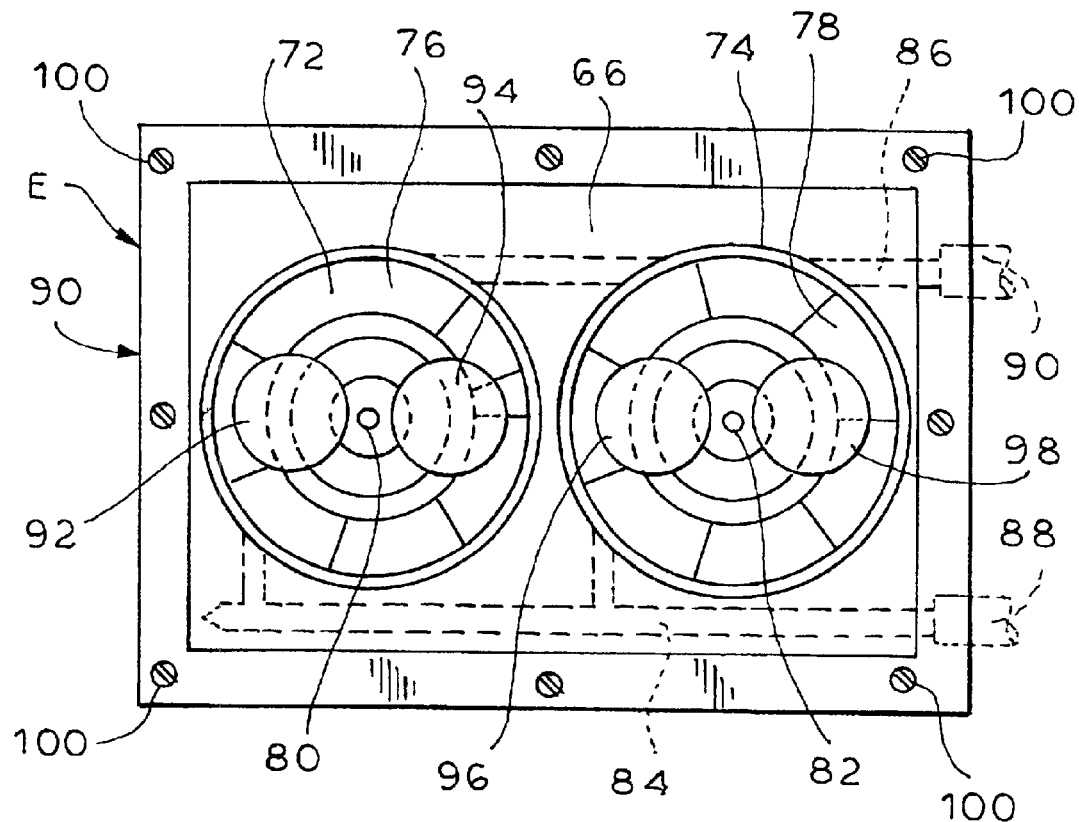
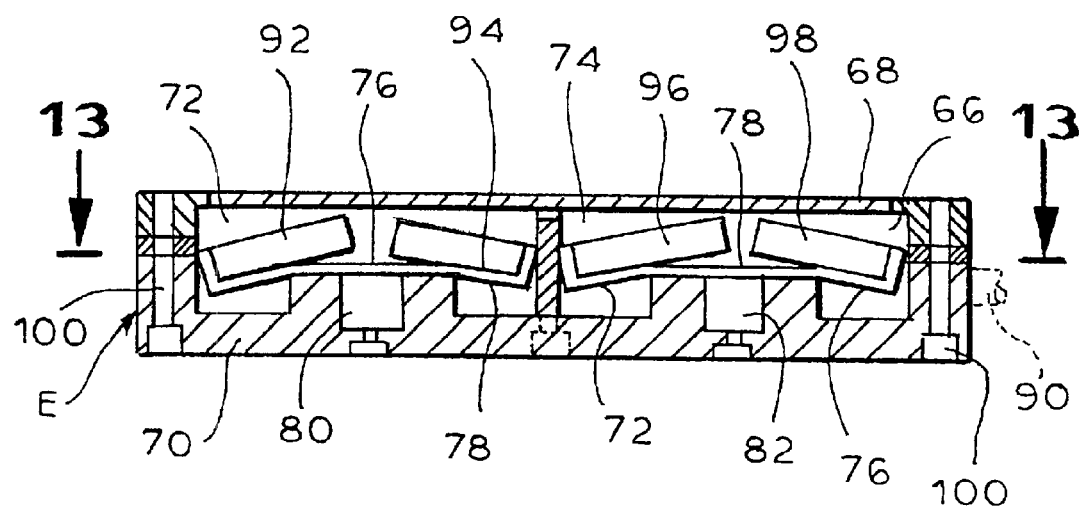
FIG.12

PARALLEL CHEMISTRY REACTOR WITH INTERCHANGEABLE VESSEL CARRYING INSERTS

The present invention relates to modular reactors for performing parallel chemical reactions and more particularly, to a modular reactor configuration having greatly enhanced versatility due to the ability to receive interchangeable inserts carrying arrays of different number and size reaction vessels, that is capable of accurate temperature control to perform reflux reactions and which is designed for use with an air driven magnetic stirrer capable of stirring viscous liquids.

Efficient testing of organic compounds in the modern pharmaceutical laboratory requires a system capable of the synthesis of large numbers of diverse organic molecules in an automated and high speed manner. The apparatus of the present invention is designed for use in such a system, particularly one which employs liquid phase synthesis techniques.

During the course of the synthesis, various operations must be performed on the samples situated in reaction vessels, including reagent introduction and removal, agitation, washing, and compound removal. Precise control of temperature, pressure and atmospheric gas mixtures may be required at various stages. These operations are standard and can be performed at task specific work stations which have been designated or modified for use with one or more reaction vessel containing reactors.

Over the last few years, a number of different systems have been developed to produce libraries of large numbers of specific types of organic molecules, such as polynucleotides. However, the usefulness of such systems tends to be limited to the particular type of molecule the system was designed to produce. The present invention is much more general in application and can be used to synthesize all types of organic compounds including those used in pharmaceutical research, the study of DNA, protein chemistry, immunology, pharmacology or biotechnology.

Aside from the lack of versatility, the equipment presently used for automated organic synthesis is often large and heavy, as well as very expensive to fabricate and operate. The systems also tend to be quite complex, requiring equipment which is limited as to flexibility, speed, and the number and amount of compounds which can as be synthesized.

One early automated system, developed for use at Zeneca Pharmaceuticals, Alderley Prk, Macclesfield, Cheshire SK10 4TG, United Kingdom, was built around an XP Zymate laboratory robot (Zymark Corporation, Hopkinton, Mass.). The robot arm is situated in the middle of a plurality of stationary work stations arranged in a circle. The arm is programmed to move one or more tube racks from one station to another. However, the Zeneca system has a small throughput capability, as the number of tube racks which can be handled at one time is limited.

An automated peptide synthesizer developed for Chiron Corporation of Emeryville, Calif., which has similar limitations, is described by Ronald N. Zukerman, Janice M. Kerr, Michael A. Siani and Steven C. Banville in an article which appeared in the International Journal of Peptide and Protein Research, Vol. 40, 1992, pages 497–506 entitled "Design, Construction and Application of a Fully Automated Equimolar Peptide Mixture Synthesizer". See also U.S. Pat. No. 5,240,680 issued Aug. 31, 1993 to Zuckerman and Banville and U.S. Pat. No. 5,252,296 issued Oct. 12, 1993 to Zuckerman, et al. entitled, "Method and Apparatus For Biopolymer Synthesis".

Another approach was developed at Takeda Chemical Industries, Ltd. and is described in an article published in the Journal of Automatic Chemistry, Vol. 11, No. 5 (September–October 1989) pp. 212–220 by Nobuyoshi Hayashi, Tobru Sugawara, Motoaki Shintani and Shinji Kato entitled, "Computer-assisted Automatic Synthesis II, Development of a Fully Automated Apparatus for Preparing Substituted N-(carboxyalkyl) Amino Acids". The Takeda system includes a plurality of stationary units which are computer controlled. The reactor unit includes only two reaction flasks. A plurality of computer controlled solenoid valves regulate the input flow from the reactant supply unit and wash solvent supply unit as well as output to the purification unit, exhaust and drainage unit. Sensors and electrodes feed information back to the computer. That system is complex, costly and inflexible. It is also very limited with respect to the number of compounds which can be synthesized.

A more flexible approach has been suggested by the Parke-Davis Pharmaceutical Research Division of Warner-Lambert, as described by Sheila Hobbs DeWitt et al. in Proc. National Academy of Science, USA, Vol. 90, pp. 6909–6913 August 1993 and in the ISLAR '93 Proceedings. That system employs a Tecan robotic sample processor. A manifold of gas dispersion tubes are employed in combination with glass vials. The glass frits of the tubes contain the solid support during reactions. However, like many prior art systems, this apparatus lacks versatility because it is designed to accept only a particular number and size reaction tube.

U.S. Pat. No. 5,472,672 issued Dec. 5, 1995 to Thomas Brennan, entitled, "Apparatus and Method for Polymer Synthesis Using Arrays", teaches the use of an automated system in which a transport mechanism used to move a base having an array of reactor vessels in conveyor belt fashion from work station to work station. Sample removal is performed by creating a pressure differential between the ends of the wells. Aside from the difficulties with regard to discharge, this system is complex and lacks flexibility because only a single size reaction vessel can be used.

The Ontogen Corporation of Carlsbad, Calif. 92009 developed a system disclosed by John Caergill and Romaine Maiefski in Laboratory Robotics and Automation, Vol. 6 pp. 139–147, in an article entitled "Automated Combinatorial Chemisry on Solid Phase" and disclosed in U.S. Pat. No. 5,609,826 entitled, "Methods and Apparatus for the Generation of Chemical Libraries" issued Mar. 11, 1997 to John Cargill and Romaine Maiefski. That system utilizes a reactor block having an array of reactor vessels. The block is moved along an assembly line of work stations under computer control.

However, the Ontogen apparatus is highly complex and expensive. It depends upon pressure differential to cause discharge through s-shaped trap tubes which snap into a fitting on the bottom of each reaction vessel. This takes up a lot of room, preventing the dense packing of the reactor vessels. It also makes product removal awkward. Because the reactor vessels of the Ontogen apparatus cannot be densely packed, mirror image reactors are required to discharge into all of the densely packed wells of a standard microtiter plate. In fact, two different reactor configurations, each capable of receiving a set of 48 reaction vessels, are required to deposit directly into all 96 of the microtiter wells.

Personnel at Bristol-Myers Squibb Company of Princeton, N.J. 08543 developed a system for use in the simultaneous synthesis of diverse organic compounds consisting of stackable modules which are moveable among nesting sites located on work station platforms. That system is described in co-pending application Ser. No. 08/991,474, filed Dec. 16, 1997. The reactor module includes a heat transfer block adapted to receive an array of reactor vessels. The reactor vessels are in the form of solid phase extraction cartridges without sorbent. Each vessel has a bottom outlet port. A plurality of separate valves arranged in rows are located below the vessels. The valves consist of stopcocks which are gang-controlled to regulate the discharge from the reactor vessel outlet ports into aligned channels, each formed by a pair of threaded Leur tip adapters. The reactor module is situated over a discharge module. The inlet openings in the discharge module are adapted to accept the threaded ends of the Leur tip adapters. The discharge module consists of a multi-well collector block or a drain block. A solvent introduction module, which includes a pressure plate having an array of openings and a septum, is received over the reactor module. The downwardly projecting rim defining each pressure plate opening cooperates with the septum to engage the mouth of the aligned reactor vessel to maintain a fluid tight seal.

Although the Bristol-Myers Squibb apparatus was a vast improvement over the prior art systems, it was still relatively large, allowing only two reactors to fit under a standard fume hood at one time. Each reactor weighed about 18 pounds and was costly to fabricate. Thus, improvements in the areas of size, weight and cost were sought including a more elegant valve system, with fewer moving parts.

The next generation Bristol-Myers Squibb reactor is described in U.S. Pat. No. 5,961,925 issued Sep. 5, 1999 to Ruediger, et al. entitled, "Apparatus for Synthesis of Multiple Organic Compounds with Pinch Valve Block." That reactor is also modular and is extremely compact and light weight. It includes a block adapted to receive an array of tube-like reactor vessels. The vessels are sized to optionally accept porous polyethelyene microcannisters with radio frequency transmitter tags.

The vessels are drained by gravity. Each vessel has a bottom port connected to an outlet tube. A valve block located below the reactor vessels simultaneously controls discharge through the outlet tubes. The valve block includes plates with aligned, relatively moveable sets of rib surfaces which act through Teflon encapsulated silicone O-ring cord sections to simultaneously close the rows of outlet tubes.

That reactor eliminates the problem of the Ontogen apparatus which requires mirror image reactor configurations by first utilizing reactor vessels in one set of 48 positions, out of the possible 52 reactor vessel positions in the reactor block, and then utilizing reactor vessels in the other set of 48 positions and shifting the relative position of the collection plate. In this way, a single reactor configuration can be employed to discharge into all of the wells of a standard 96 well microtiter plate.

While the reactor described in U.S. Pat. No. 5,961,925 is a great improvement over prior systems, it was designed to maximize solid phase reactions and is not as well suited for performing solution phase reactions. Because the vessels are drained from the bottom, through a valve, it is not capable of stirring viscous liquids when used with conventional magnetic stirrers because the reactor vessels are located too far from the magnets to develop a significant magnetic field in the vessels. Thus, it does not work well on a standard magnetic stirrer plate. This reactor is also not well suited for reactions which require cryogenic conditions. It cannot perform reflux reactions that require a temperature differential be maintained in the vessels. Further, the reactor of U.S. Pat. No. 5,961,925 has a temperature limitation of about 80° C. because of the plastic Leur tip adapters that form a part of the drainage system.

The present invention overcomes these disadvantages in that it is designed to optimize solution phase reactions. Gravity drainage is eliminated, as is the valve block, permitting the vessels to seat low enough in the apparatus to utilize a magnetic stirrer. It can be used to perform reflux reactions because a temperature differential can be maintained across the length of the reaction vessels. Only all glass components are used, eliminating the temperature limitation inherent when plastic parts are present. Further, the reactor can be used under higher pressures.

We are also aware of a product line of temperature control units, stirrers and shakers manufactured by Barnstead Thermolyne of Dubuque, Iowa, sold by Cole-Parmer Instrument Company of Vernon Hills, Illinois under the trademark STEM. Some of the STEM components use removable vessel holders and in one case, a liquid-cooled reflux module can be mounted over the vessel holder. However, the STEM products have numerous drawbacks. The units are too high to permit them to be used with certain standard liquid handlers such as the Gilson 215, without significant structural modification.

Further, although some of the STEM components have removeable vessel holders, each component can accept only vessel holders with a single number of positions. Thus, all of the holders for a particular component can accept only the same number of vessels, although the vessels may be different sizes. For example, a particular component may be capable of receiving either of two ten position vessel holders, one for ten 12 mm vessels and a second for ten 25 mm vessels. The components cannot accommodate vessel holders with different numbers of positions, thereby severely limiting the flexibility of the apparatus.

Another major drawback of the STEM components is price. The components with a ten position vessel holder, for example, cost about $5,000.00. Increasing the number of positions to twenty-five, increases the cost to over $20,000.00.

The present invention is designed for use with commonly used automated liquid handlers, including the Gilson 215, without modification. It is compact, light weight and much less expensive than the Barnstead Thermolyne components. It is also much more versatile, utilizing interchangeable vessel carrying inserts which make the reactor suitable for use with a variety of different size and number reaction vessels.

It is, therefore, a prime object of the present invention to provide a modular parallel chemistry reactor capable of use with interchangeable reaction vessel carrying inserts.

It is another object of the present invention to provide a parallel chemistry reactor with interchangeable vessel carrying inserts in which different inserts are capable of carrying arrays of different numbers of different size reaction vessels.

It is another object of the present invention to provide a parallel chemistry reactor with interchangeable vessel carrying inserts that is capable of use with standard laboratory equipment such as automated liquid introduction apparatus, microtiter plates, magnetic stirrers, shakers and fume hoods.

It is another object of the present invention to provide a parallel chemistry reactor with interchangeable vessel carrying inserts that is capable of performing reactions under cryogenic conditions.

It is another object of the present invention to provide a parallel chemistry reactor with interchangeable vessel carrying inserts well suited for liquid phase reactions.

It is another object of the present invention to provide a parallel chemistry reactor with interchangeable vessel carrying inserts capable of stirring viscous liquids and slurries, when used with the air driven magnetic stirrer.

It is another object of the present invention to provide a parallel chemistry reactor with interchangeable vessel carrying inserts designed for use in conjunction with an air driven magnetic stirring apparatus.

It is another object of the present invention to provide a parallel chemistry reactor with interchangeable vessel carrying inserts capable of performing reflux reactions.

In accordance with one aspect of the present invention, modular apparatus for performing parallel chemistry reactions in a plurality of reaction vessels is provided. The apparatus comprises a base including a frame with a wall defining an insert receiving opening and an insert adapted to be removeably received within the frame opening. The insert includes an array of reaction vessel receiving recesses. A pressure plate is provided having an array of openings aligned with the recesses, respectively. The pressure plate and a septum are mounted above the base, spaced from the insert, with the reaction vessels situated therebetween.

A second insert is provided. The second insert and first insert are adapted to be interchangeably received within the frame opening.

The apparatus is adapted for use with a standard automated liquid handler capable of dispensing liquid to a plurality of preset locations. In each insert configuration, the insert recesses are arranged so as to align with the liquid handler dispensing locations.

One insert configuration has at least 48 recesses, each adapted to receive a 11.6 mm reaction vessel. A second insert configuration has 24 recesses, each adapted to receive a 17 mm reaction vessel. A third insert configuration has 9 recesses, each adapted to receive a 24 mm reaction vessel. A fourth insert configuration has 6 recesses, each adapted to receive a 34 mm reaction vessel.

To maximize the heat transfer between the base and the vessels, distribute the load uniformly and self-center the vessels, each of the recesses has a substantially conical or semi-circular bottom. This configuration permits the vessels to seat as low as possible in the insert which is important when a magnetic stirrer is utilized. Recesses with a conical bottom have an opening at the lowest point. The opening is a result of drilling to form the conical shape in the recesses designed to receive the larger vessels. The opening has the added function of permitting trapped air to escape.

The frame includes means for securing the base on a shaker table. The securing means may comprise one or more slots adapted to receive protrusions on the shaker table.

An insulator pad may be provided. The frame is adapted to rest on the pad. A conductor plate upon which the frame is adapted to rest may also be provided.

The frame has channels through which pressurized gas or liquid flows for regulation of the temperature of the bottom portions of the reaction vessels. The channel has an entrance port and an exit port such that the fluid can circulate through the frame.

Preferably, the insert has an opening for receiving a thermocouple. Placing the thermo-couple in the insert permits increased accuracy in the regulation of the temperature of the frame through feedback to the fluid temperature control system.

The insert is designed for use with an insert extraction tool having a protrusion. The insert has a protrusion receiving opening. The protrusion is expandable, to frictionally engage the protrusion receiving opening, in order to facilitate removal of the insert from the frame. In one embodiment, the extraction tool includes means for maintaining the protrusion in the expanded condition.

The frame opening and insert are shaped such that the insert can be received within the frame opening in only a single orientation. The insert comprises first and second rounded corners. Each of the first and second rounded corners of the insert has a radius. The radius of the first insert corner is different than the radius of the second insert corner.

The wall of the frame opening also has first and second round corners. Each of the first and second rounded corners of the frame wall has a radius. The radius of the first frame wall corner is different from the radius of the second frame wall corner.

The radius of the first insert corner corresponds to the radius of the first frame wall corner. The radius of the second insert corner corresponds to the radius of the second frame wall corner.

The frame has a bottom surface. The frame wall is inclined relative to a line perpendicular to the bottom surface of the frame. The insert includes an outer wall and a bottom surface. The outer wall is inclined relative to a line perpendicular to the bottom surface. The inclination of the frame wall preferably corresponds to the inclination of the insert wall. The inclination of the frame wall is approximately one degree. The inclination of the insert wall is also approximately one degree. The frame wall also preferably includes an outwardly extending shoulder adapted to rest on the top surface of the frame.

A temperature control module may be interposed between the frame and the pressure plate, surrounding the reaction vessels. This module controls the temperature of the upper portions of the vessels.

A magnetic stir bar may be received within a reaction vessel. Magnetic stirrer means is provided for use in combination with the apparatus. The frame is adapted to be situated on the stirrer means.

The magnetic stirrer means includes a body with an opening. An impeller is freely rotatably received within the opening. Magnetic means in the form of first and second magnets are associated with the impeller. A flow of pressurized gas preferably air, through the opening is provided to rotate the impeller.

The flow means includes an input port in the stirrer means body. A first channel is provided within the stirrer body, extending between the input port and the impeller receiving opening. An output port is provided in the stirrer body. A second channel within the stirrer body extends between the impeller receiving opening and the output port.

A second opening is preferably provided in the stirrer body. A second impeller is freely rotatably received within the second opening. Second magnetic means in the form third and fourth magnets are associated with the second impeller. Means for operably connecting the second opening between the first and the second channels are provided.

Means are provided for regulating the flow to the impeller receiving openings. In this way, the flow to each opening can be controlled so that the flow to the openings is approximately equal.

Magnetic stir bars are provided in the reaction vessels. Preferably, the length of the stir bar is greater than the inner diameter of the reaction vessel within which it is situated. Maximum agitation is achieved in this manner.

The stirrer can be used on a standard shaker platform. The shaker platform is provided with upstanding pins. The frame includes means for engaging the shaker platform pins.

If heating is required when stirring is taking place, a thin, electrically heated plate can be interposed between the frame and the stirrer means. Alternatively, heated fluid can be circulated through the frame.

In accordance with another aspect of the present invention, a reaction vessel carrying insert is provided for use in modular apparatus for performing parallel chemistry reactions. The apparatus has a base including a frame with a wall defining an insert receiving opening. The insert is adaptable to be received within the frame opening and includes an array of reaction vessel receiving recesses.

The apparatus is adapted for use with a standard automated liquid handler capable of dispensing liquid to a plurality of preset locations. The recesses in the insert are located so as to conform with standard laboratory arrays and align with the preset liquid dispenser locations.

In one configuration, the insert has at least 48 recesses, each adapted to receive an 11.6 mm reaction vessel. In a second configuration, the insert has 24 recesses, each adapted to receive a 17 mm reaction vessel. In a third configuration, the insert has 9 recesses, each adapted to receive a 24 mm reaction vessel. In a fourth configuration, the insert has 6 recesses, each adapted to receive a 34 mm reaction vessel. In all cases, a center-to-center distance of 9 mm is provided to accommodate a multiprobe Gilson liquid handler.

Each of the recesses has a substantially conical or semi-circular bottom portion. Each of the recesses has an opening. The opening is situated at the bottom portion of the recess.

Preferably, the insert includes an opening adapted to receive a thermocouple. Locating the thermocouple directly in the insert facilitates accurate temperature control.

The insert is designed for use with an extraction tool having a protrusion. The insert has a protrusion receiving opening. The protrusion is expanded so as to frictionally engage the protrusion receiving opening. In one embodiment of the tool, means are provided for maintaining the protrusion in the expanded state.

The insert includes first and second rounded corners. Each of the rounded corners of the insert has a radius. The radius of the first insert corner is different than the radius of the second insert corner.

The insert includes an outer wall and a bottom surface. The outer wall is inclined relative to a line perpendicular to the bottom surface. The inclination of the insert wall is approximately one degree. The insert also preferably has an outwardly extending shoulder.

In accordance with another object of the present invention, magnetic stirrer means are provided for use with a parallel chemistry reactor. The stirrer means includes a body with an opening and an impeller freely rotatably received within the opening. Magnetic means in the form of first and second magnets are associated with the impeller. Means for providing a flow of pressurized gas or liquid through the opening rotates the impeller.

The flow means includes an input port in the stirrer body. A first channel is situated within the stirrer body, extending between the input port and the impeller receiving opening. An output port is provided in the stirrer body. A second channel within the stirrer base extends between the impeller receiving opening and the output port.

A second opening is provided in the stirrer body. A second impeller is freely rotatably received within the second opening in the stirrer body. Second magnetic means in the form of third and fourth magnets are associated with the second impeller. Means are provided for operably connecting the second opening between the first and the second channels. Means are provided for regulating the flow to the impeller receiving openings such that the flow to the openings is approximately equal.

The stirrer is designed for use with a shaker platform with upstanding pins. The stirrer body includes means for engaging said shaker platform pins.

To these and to such other objects which may hereinafter appear, the present invention relates to modular apparatus for performing parallel process chemistry as described in detail in the following specification and recited in the annexed claims, taken together with the accompanying drawings, wherein like numerals refer to like parts, and in which:

FIG. 3 is a top elevational view of the base of the reactor, showing one configuration of the reaction vessel carrying insert and the frame;

FIG. 4 is a side cross-sectional view of the reactor of FIG. 1 shown on an insulating plate and magnetic stirrer;

FIG. 12 is a side cross-sectional view of the magnetic stirrer of the present invention; and FIG. 13 is a top cross-sectional view taken along line 13—13 of FIG. 12.

Figure 1:
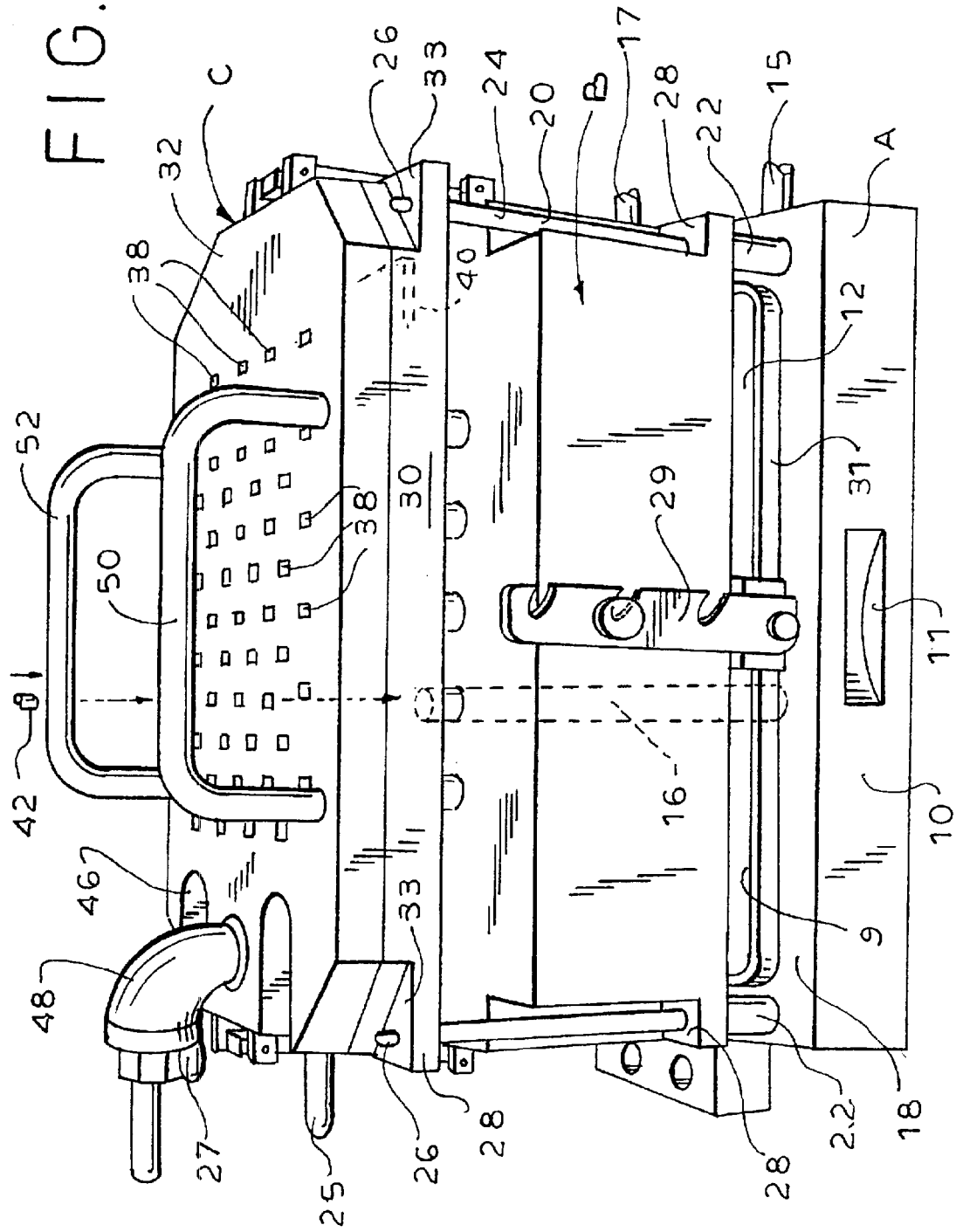
FIG. 1 is an isometric view of the reactor of the present invention.
Figure 2:
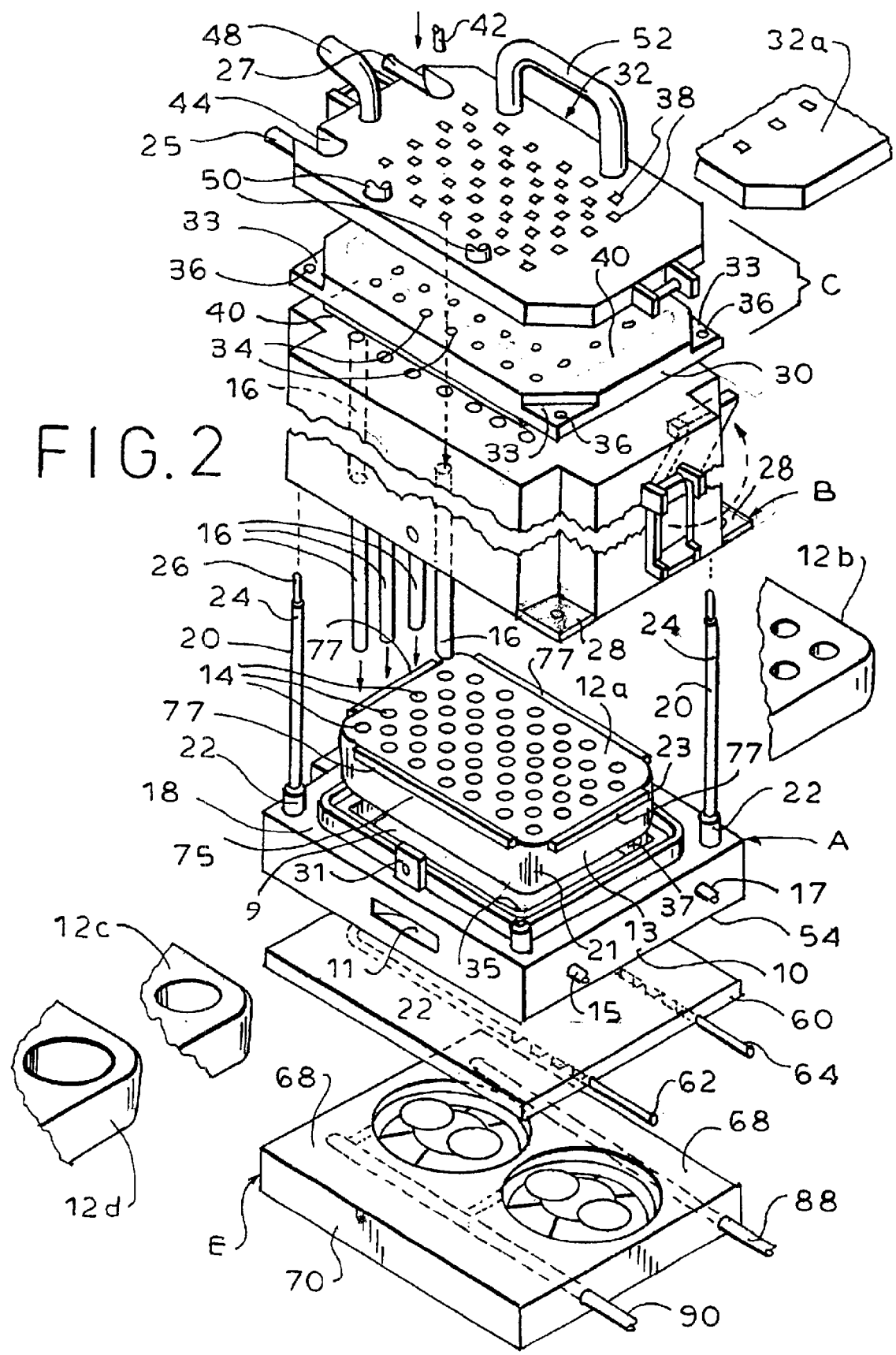
FIG. 2 is an exploded isometric view of the reactor of FIG. 1 shown situated on the magnetic stirrer of the present invention.

As best seen in FIGS. 1, 2 and 4, the modular reactor of the present invention includes a base, generally designated A. Base A consists of a frame 10 which has an opening 9 adapted to receive one of a number of different removable inserts 12. Inserts 12 are provided in a variety of different configurations, four of which are illustrated in the drawings. Each insert 12 has the same outer dimensions such that the inserts are interchangeably receivable in frame 10. Inserts 12 are composed of heat conductive material, such as metal, preferably aluminum.

Frame 10 is provided with side slots 11 which enable the reactor to be affixed to a standard shaker table with corresponding protrusions (not shown) adapted to be received in slots 11. Frame 10 is also composed of heat conductive material, such as metal, preferably aluminum, and has an internal flow channel 13, as seen in FIGS. 3 and 4. Channel 13 receives fluid, either pressurized gas or liquid, through input port 15. The fluid circulates through the frame and exits through output port 17. Regulating the temperature of the fluid controls the temperature of the frame and hence of the insert 12 received therein.

Each insert 12 has an array of recesses 14 adapted to accept a plurality of tube-like reaction vessels or vials 16.

The location, number and size of vessels 16 which can be received in each insert 12 varies, as described in detail below. This permits the same reactor to be used with different numbers and size reaction vessels, enhancing the versatility of the reactor by eliminating the need for different reactors to perform different types of reactions. This greatly reduces the expense and time necessary to automate a laboratory.

The locations of the vessels 16 are critical because the reactor is designed for use with standard laboratory equipment such as a Gilson automated liquid handler which has preset liquid dispensing locations set on a Cartsean grid. Thus, the recesses are situated 9 mm apart. Further, it is important that inserts 12 be received in frame 10 in only a single orientation.

This is accomplished by fabricating the insert corners so that the insert can be received in frame only one way. Specifically, each insert 12 has two corners 21 with a radius of 0.250 inches, for example and two corners 23 with a radius of 0.350 inches, for example. Similarly two corners 35 of the frame opening wall have a radius which corresponds with that of insert corners 21 whereas corners 37 of the frame opening wall have a radius which corresponds to that of insert corners 23.

Extending upwardly from each of the corners of the top surface 18 of frame 10 are four multi-level stand-offs 20. Each stand-off 20 consists of a lower, large diameter section 22, an intermediate section 24 and a top, smaller diameter, bullet shaped section 26. Stand-offs 20 serve to align and support the reactor modules.

A temperature control module or jacket, generally designated B, is received over base A, surrounding each of the reactor vessels 16. Module B has a lower portion 28 which rests on sections 22 of stand-offs 20 such that it is spaced a short distance above the top of base A. Module B is made of heat conducting metal and has a plurality of cylindrical bores, one for each vessel, such that the vessels are received in and surrounded by the body of the module. A series of flow channels for pressurized gas or liquid are present within module B. "L" shaped fluid input and outlet connectors 25, 27 are provided to permit the flow of fluid through the module for temperature control purposes. Module B controls the temperature of the upper portions of vessels 16.

The corners of module B, above portion 28, are recessed so as to clear intermediate sections 24 of stand-offs 20. The reactor can be used with or without module B, depending upon whether control of the temperature of the upper portions of vessels 16 is required. For example, when reflux reactions are performed, base A maintains the lower portions of vessels 16 at one temperature while module B maintains the upper portions of the vessels at a different temperature. If vessels 16 are full, base A and module B can be heated with the same fluid to maintain a uniform temperature at the top and bottom walls of the vessels.

Latches 29 are located in either side of the reactor. Each latch 29 is pivotally affixed to an upstanding bracket 31 extending upward from surface 18 of frame 10. Each latch 29 has three spaced slots. The middle slot receives a screw extending from module B. The top and bottom slots receive screws from top and bottom vessel alignment plates (not shown) employed when module B is not present. Similar alignment plates are illustrated in Ruediger U.S. Pat. No. 5,961,925 issued Oct. 5, 1999.

Spaced a short distance above module B is situated the introduction module, generally designated C. Module C seals the open mouths of the reactor vessels 16 and at the same time permits the introduction of various fluids into the vessels. Module C consists of a lower plate 30, an upper plate 32 and a septum mat 40.

Plate 30 has a plurality of openings 34. One opening 34 is provided for and is aligned with each vessel 16. Plate 30 also has a plurality of downwardly directed hollow, needle-like protrusions 37, extending from its lower surface, as seen in FIG. 4.

Situated over and attached to plate 30 is upper plate 32. Plate 32 also has a plurality of openings 38. Openings 38 are arranged in the same pattern as and aligned with openings 34 in plate 30.

Each of the four corners 33 of plate 30 is provided with an opening 36 for receiving section 26 of one of the stand-off 20 such that plate 30 rests on the top surfaces of sections 24 of the four stand-offs. This maintains plate 30 at the appropriate distance from base A, whether or not module B is present.

Septum mat 40 is situated below plate 30, between plate 30 and the rims of vessels 16. Protrusions 39 protrude through mat 40 and out the lower surface thereof. When required, inert gas can be introduce into upper plate 32 and will pass through plate 30, and protrusions 37 extending downwardly therefrom, into the vessels 16. Mat 40 is preferably 5 mm thick, consisting of tan case PTFE Teflon bonded to white silicone rubber.

For applications not requiring inert gas, plate 32 is replaced by a blank plate 32a and plate 30 is eliminated. Mat 40 is clamped between plate 32a and the tops of vessels 16.

Fluids are introduced into the vessels from above by a needle 42. Needle 42 is inserted through each set of aligned openings 38 in plate 32 and openings 34 in plate 30 and penetrates the septum mat 40 such that the tip of the needle is received within the reaction vessel, as shown in FIG. 4.

Although fluid introduction can be done manually, the reactor is designed for use with a standard automated liquid handler (not shown), such as a Gilson 215 liquid handler or compatible apparatus. The liquid handler is designed to dispense fluid at pre-set locations on a Cartesian coordinate grid. Accordingly, it is critical that the recesses in each insert 12, as well as the openings in plates 30 and 32, be situated so as to align with the pre-set dispensing locations of the liquid handler.

Plates 30 and 32 are constructed with slots 44, 46. Slots 44, 46 accommodate the "L" shaped input and output fluid connectors 25, 27 extending from the upper surface of module B.

As mentioned previously, certain procedures require an inert gas atmosphere, such as nitrogen. Accordingly, an "L" shaped gas input connector 48 is provided extending upward from the top surface of plate 32. This permits the introduction of the inert gas into plate 32. The inert gas passes through plate 30 and protrusions 37 which penetrate mat 40 and into the vessels 16. Also extending upward from the top surface of plate 32 are a pair of handle grips 50, 52 to facilitate movement of the reactor from one site to another.

Frame 10 can receive any one of a number of inserts 12 of different configurations. Four typical insert configurations are illustrated. FIGS. 2 and 3 illustrate one insert configuration 12a which consists of at least 48 recesses 14, 52 vessel receiving recesses are shown. Each recess in insert 12a is adapted to receive a 11.6 mm reaction vessel.

Figure 6:
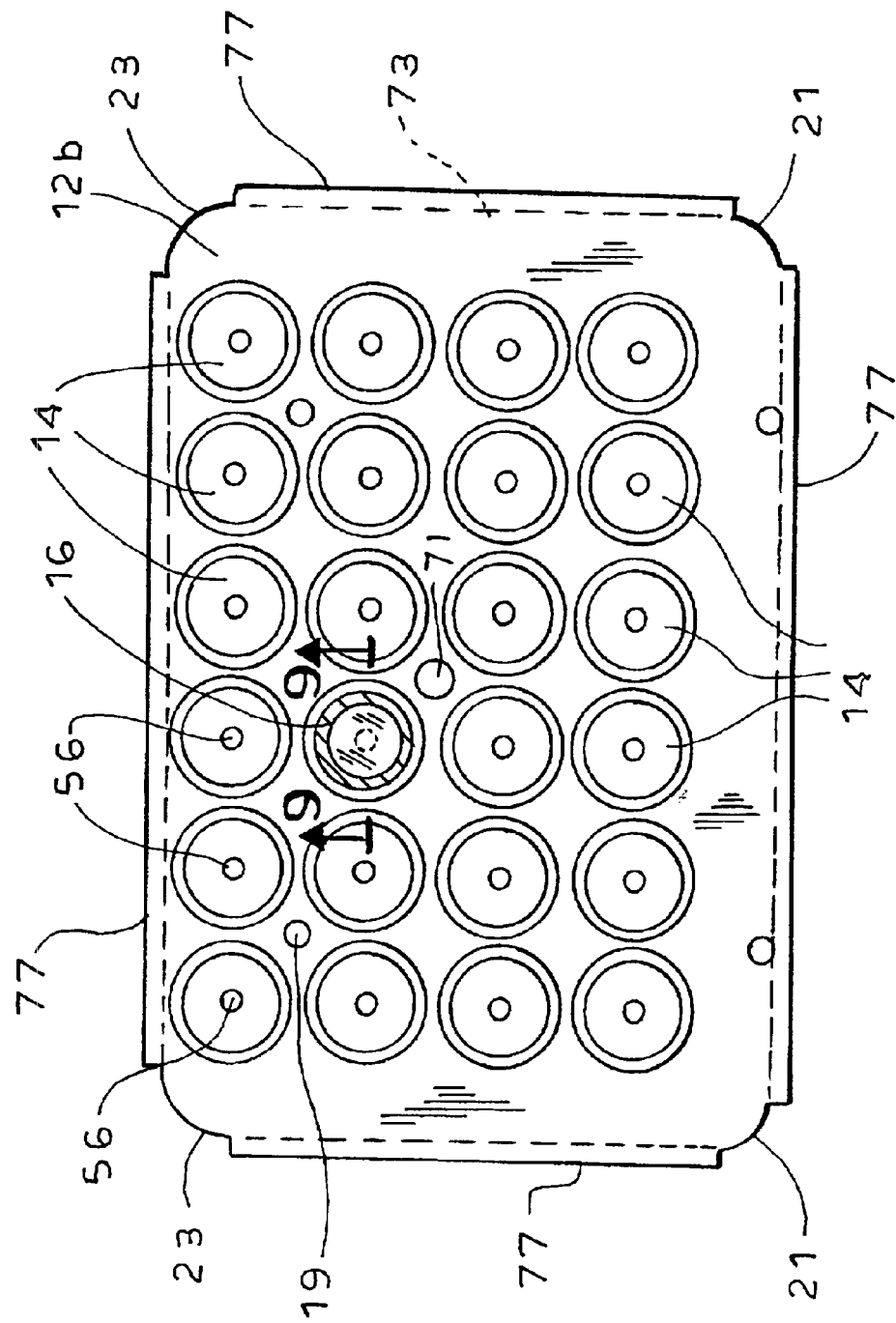
FIG. 6 is a top elevational view of a second configuration of the insert
Figure 7:
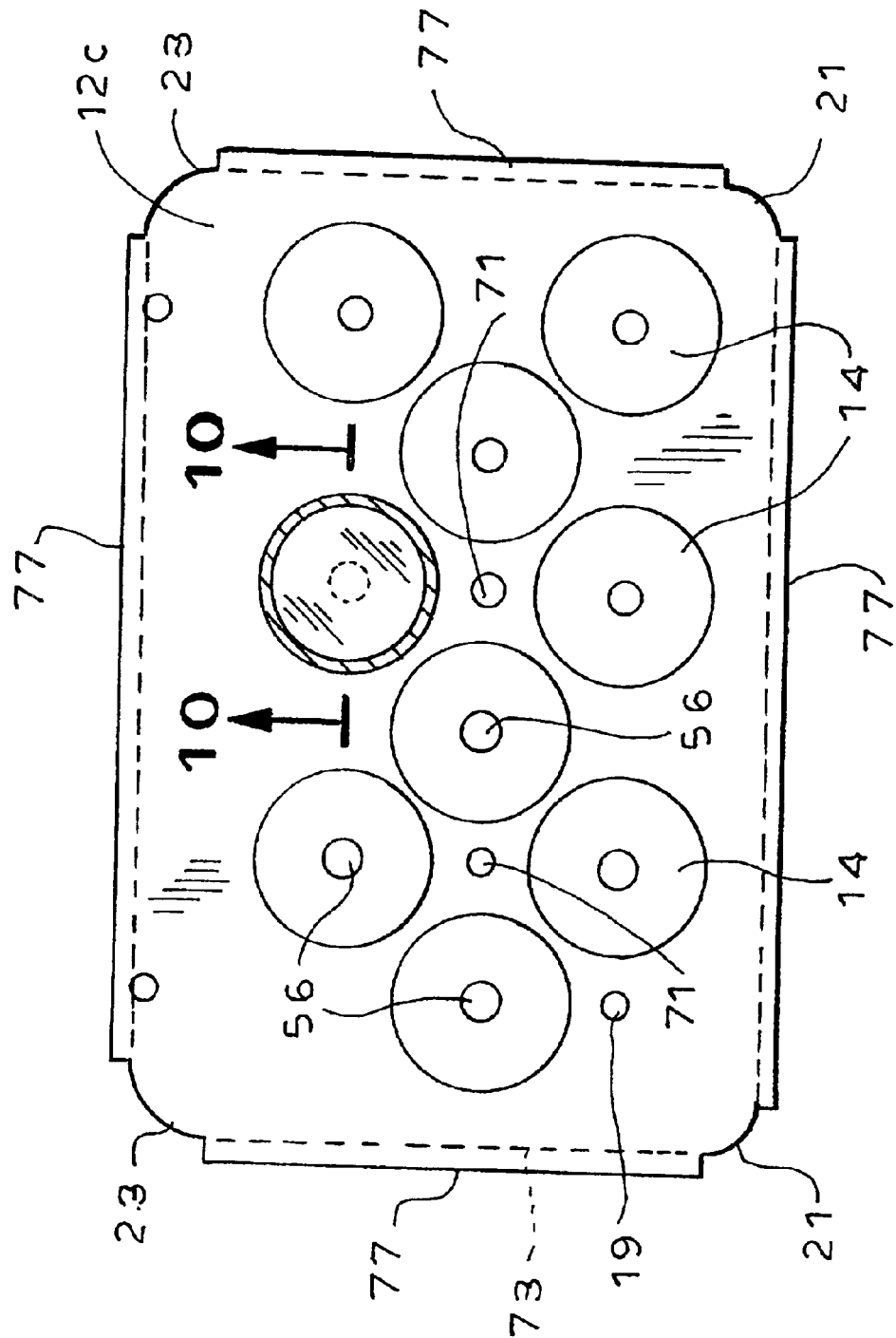
FIG. 7 is a top elevational view of a third configuration of the insert.
Figure 8:
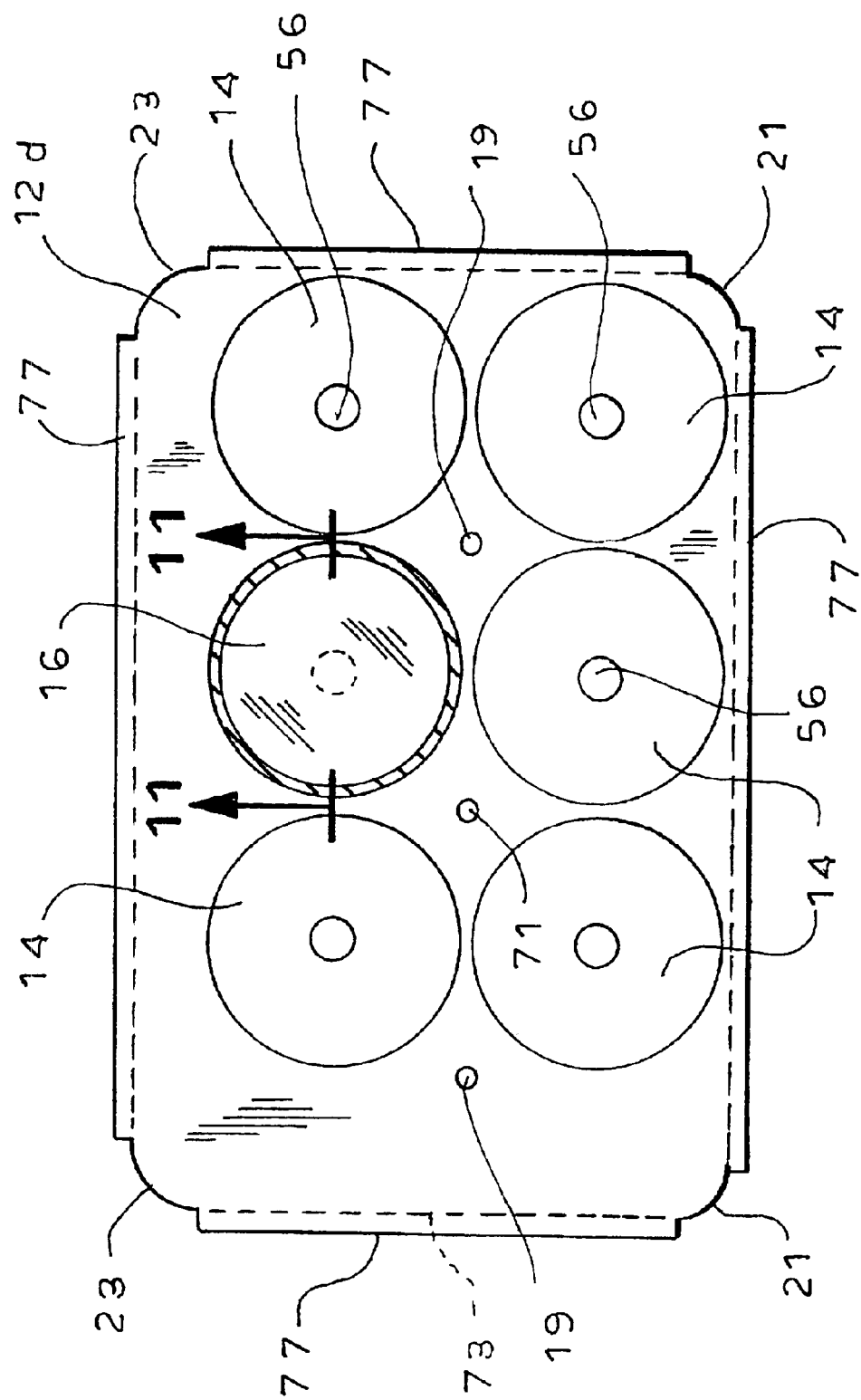
FIG. 8 is a top elevational view of a fourth configuration of the insert.

FIG. 6 illustrates a second insert configuration 12b which has 24 recesses 14, each adapted to receive a 17 mm reaction vessel. FIG. 7 illustrates a third insert configuration 12c with 9 recesses 14, each adapted to receive a 24 mm reaction vessel. FIG. 8 illustrates a fourth insert configuration 12d with six recesses 14, each adapted to receive a 34 mm reaction vessel. All insert configurations have the exact same exterior dimensions so that any one of the inserts can be used with frame 10.

Each insert 12 is provided with an opening 19 designed to receive a thermo-couple. By mounting the thermocouple directly in the insert body, more accurate control of the temperature of the vessels 16 can be achieved. The output signal from the thermocouple is used to regulate the system which controls the temperature of the fluid which flows through channel 13 in base A.

Because inserts 12 must be lifted directly upwards to be removed from frame 10 and because the space between stand-offs 20 is limited due to the small size of the reactor, an extraction tool has been developed to facilitate handling of the insert. Two different embodiments of the tool D and D' are disclosed. Each tool has a protrusion which can be received in and frictionally engages a recess in the insert.

Figure 5A:
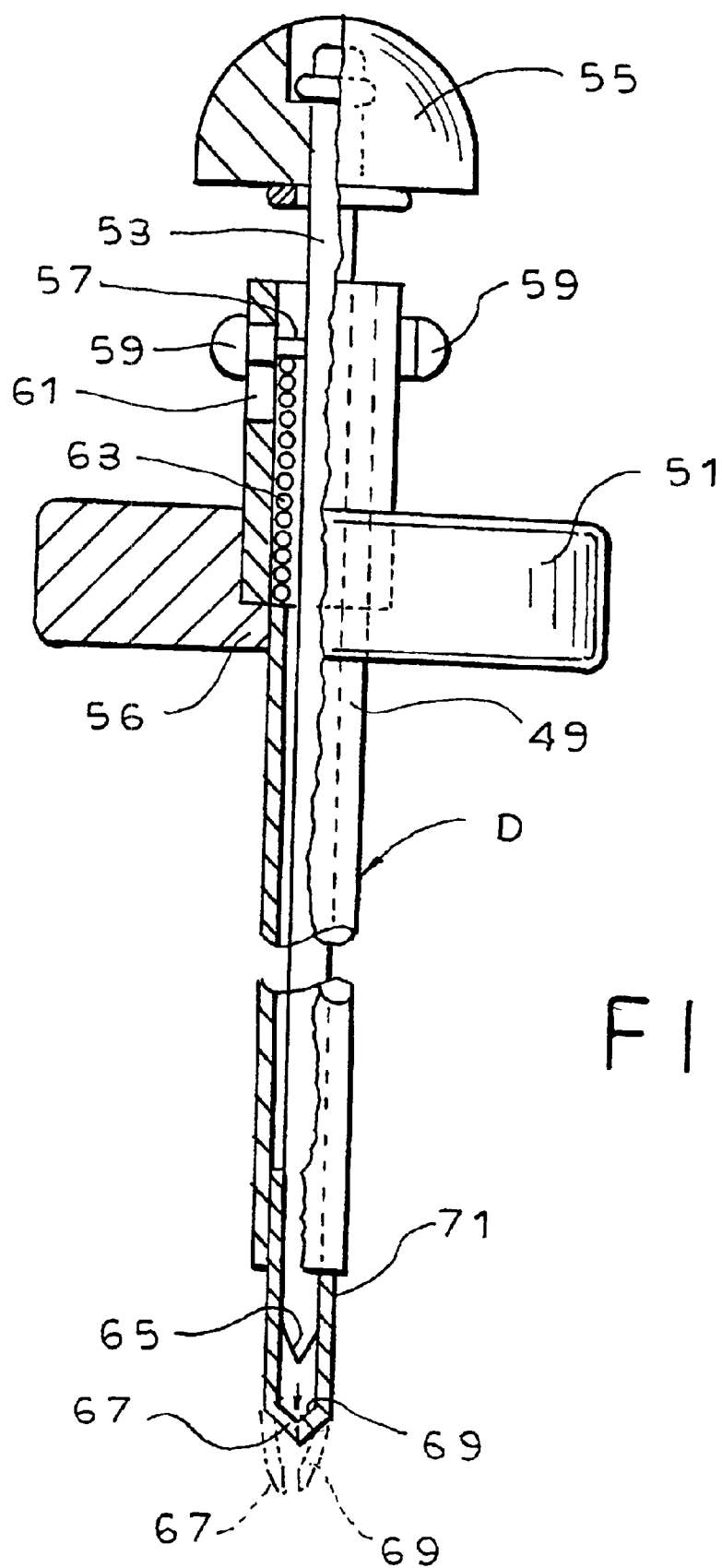
FIGS. 5a and 5b are, respectively, partially cut away views of the first and second embodiments of the insert extraction tool of the present invention.
Figure 5B:
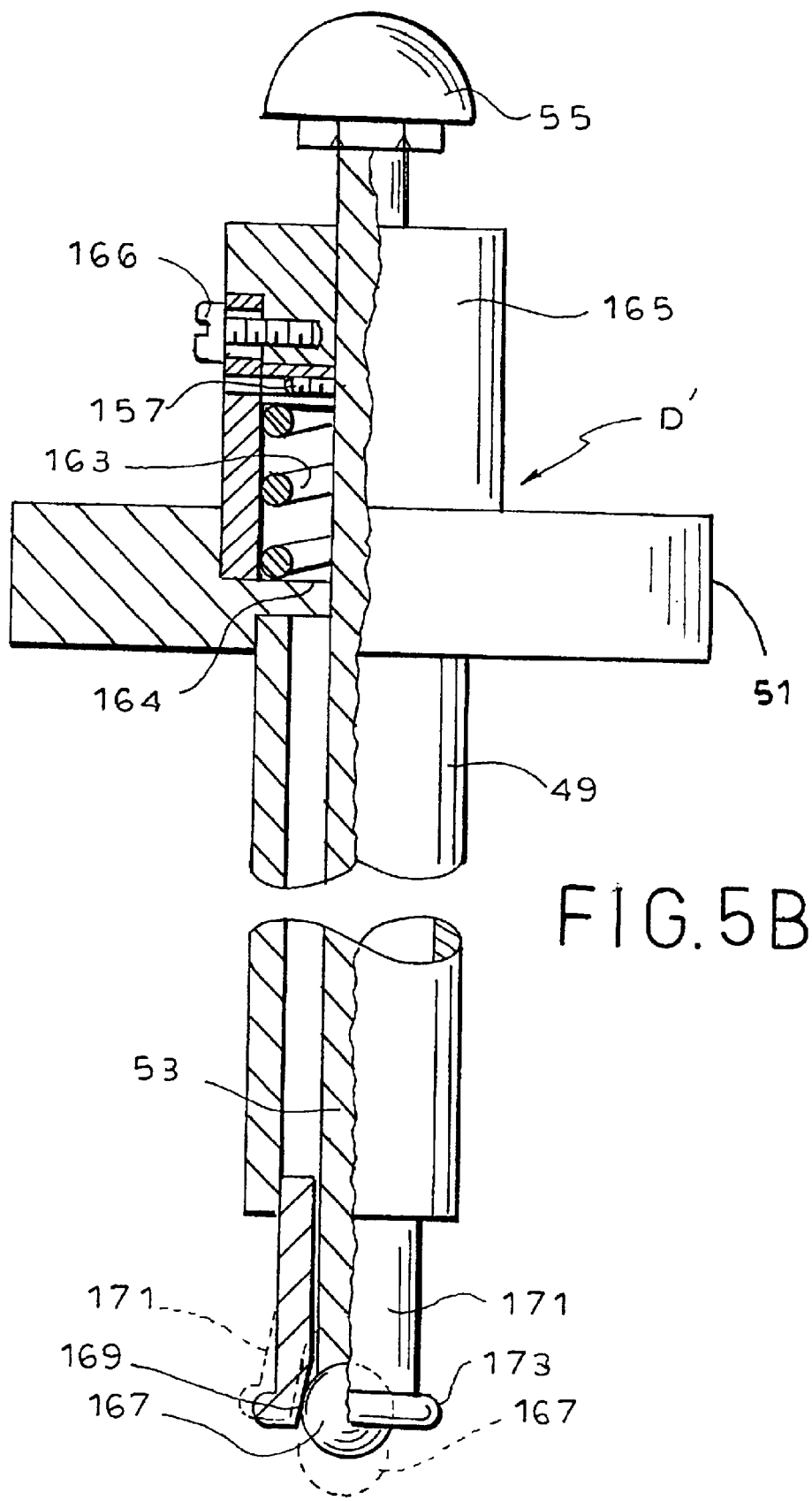

The different embodiments of the extraction tool are illustrated in FIGS. 5a and 5b. Tool D illustrated in FIG. 5a consists of a hollow tubular body 49 to which an outwardly extending finger grip bar 51 is fixedly attached. Situated within body 49 is a movable pin 53 to which an enlarged, semi-hemispherical head 55 is affixed.

Extending radially outwardly from pin 53, in opposite directions, are a pair of elements 57 with enlarged heads 59. Slots 61 formed in body 49 permit elements 57 (and hence pin 53) to move a limited distance in the direction of the axis of body 49.

Situated between elements 57 and a shoulder 56 within bar 51, and received around pin 53, is a helical compression spring 63. Gripping bar 51 with the fingers and placing head 55 in the palm of the hand permits one to squeeze the hand to move pin 53 along body 49, against the urging of spring 63, as elements 57 travel along slots 61. Releasing the head permits spring 63 to move pin 53 back to its original position.

The tip 65 of pin 53 is conically shaped with inclined surfaces. The flexible metal tip 67 of body 49, within which pin tip 65 is received, is split in four sections which have internal inclined surfaces 69. As pin 53 moves toward tip 67, the inclined surfaces 65 of the pin tip cooperate with the inclined surface 69 of the body tip to cause the sections of body tip 67 to move apart a short distance, expanding the diameter of the tip. When the pin tip withdraws, the resiliency of the material of which tip 67 is made causes the tip section to move together back to the original, non-expanded position.

Accordingly, pushing head 55 toward bar 51 causes tip 67 to expand radially outwardly so as to frictionally engage the insert recess. Releasing the head permits spring 63 to withdraw the pin from tip 67, causing tip 67 to return to its original size.

The second embodiment of the extraction tool, generally designated D', is illustrated in FIG. 5B. Tool D' differs functionally from the first embodiment of the tool D described above in that the protrusion is normally in the expanded state and hence in the gripping mode and must be actuated by depressing the head to release the insert. This design has the advantage of being easier to manipulate and less likely to be accidentally released while transporting the insert because the head does not need to be continuously depressed against the action of the spring to maintain engagement with the insert.

As seen in FIG. 5B, tool D' consists of a hollow tubular body 49 to which an outwardly extending finger grip bar 51 is fixedly attached. Situated within body 49 is a moveable pin 53. A hemispherical head 55 is attached to the top of pin 53.

Extending radially outwardly from pin 53 are a pair of bushings 157. A pressure spring 163 is situated between bushings 157 and a wall 164 which forms the floor of the channel within body 49 in which the spring 163 is situated. End cap 165 forms the top of body 49 and is held in place by a screw 166. End cap 165 is removed to insert spring 163 during assembly.

The lower end of pin 53 carries a ball 167. Ball 167, in its normal position (shown in solid) bears against inclined surfaces 169 which form the interior of the sections of flexible metal tip 171. Tip 171 is split lengthwise into sections and is provided with a circumferential flange 173.

Spring 163 normally urges pin 51 in a direction toward the top of body 49, urging ball 167 to cause the sections of tip 171 to flare outwardly, expanding the tip 171. Depressing head 55 moves pin 53 toward the bottom of body 49, moving ball 167 out of tip 171 and allowing the sections of tip 171 to return to their original non-expanded state, as seen in phantom in the drawing.

Each insert 12 is provided with one or more tool receiving recesses 71. When using the first embodiment of the extraction tool, tip 67 of tool D is situated in recess 71 in the insert. Bar 51 is grasped and the hand is squeezed to move head 55 toward bar 51, causing tip 67 to expand and frictionally engage the recess. The head must be held in the depressed position in order to maintain engagement with the insert. To release the insert, head 55 is released, spring 63 is allowed to expand, withdrawing pin 65 from tip 67 such that tip 67 returns to the non-expanded state. As tip 67 contracts, tool D is released from recess 71.

When using the second embodiment of the extraction tool D', before insertion of tip 171 into recess 71, bar 51 is grasped and head 55 depressed, causing ball 167 to move out of tip 171 and tip 171 to contract to the non-expanded state. Tip 171 is then placed within recess 71 in insert 12 and head 55 is released such that a spring 163 moves ball 167 into tip 171 causing the tip to expand. The insert is now engaged by tool D' and can be moved as necessary, without application of any force on head 55. When it is desired to release the insert, head 55 is depressed, ball 167 moves out of tip 171, which contracts to the non-expanded state so that tip 171 can be withdrawn from recess 71 in the insert.

Body 49 is long and slender enough to permit the tool to fit between vessels 14. Once the insert is engaged by the tool, it can easily be lifted from the base frame and removed from the reactor.

To further facilitate removal of insert 12 from frame 10, the exterior wall 73 of the insert is slightly inclined (preferably about 1 degree) from a line perpendicular to the bottom surface 54 of the insert, as shown in FIG. 4. The interior wall 75 of the insert receiving opening 9 of frame 10 is correspondingly inclined. Further, each side of insert 12 is provided with a lip or shoulder 77 which extends outwardly from the top surface of the insert. Lips 77 rest on surface 18 of frame 10 to keep the insert from seating too low within the frame.

Figure 9:
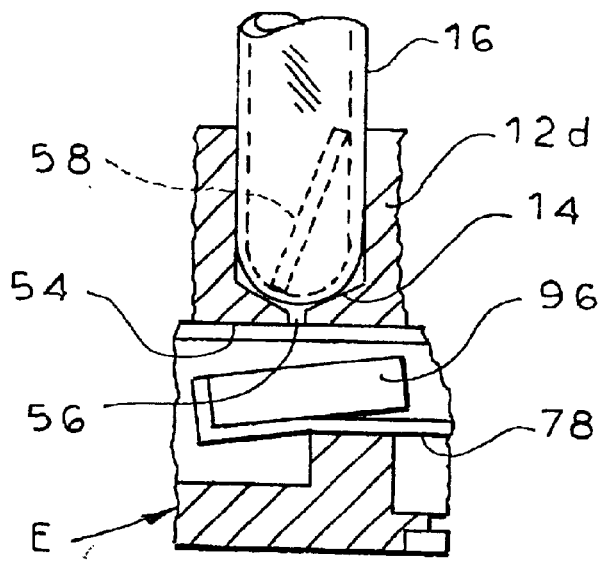
FIG. 9 is a cross-sectional view of a portion of the insert, reaction vessel, recess and stirrer, taken along line 9—9 of FIG. 6.
Figure 10:
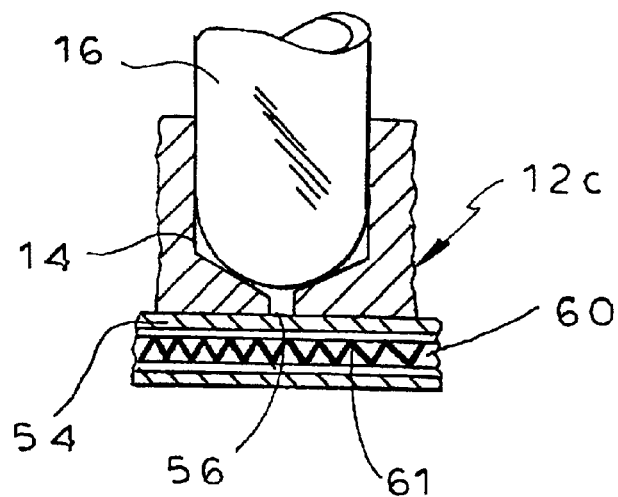
FIG. 10 is a cross-sectional view of a portion of the insert, reaction vessel, recess and heater plate, taken along line 10—10 of FIG. 7.
Figure 11:
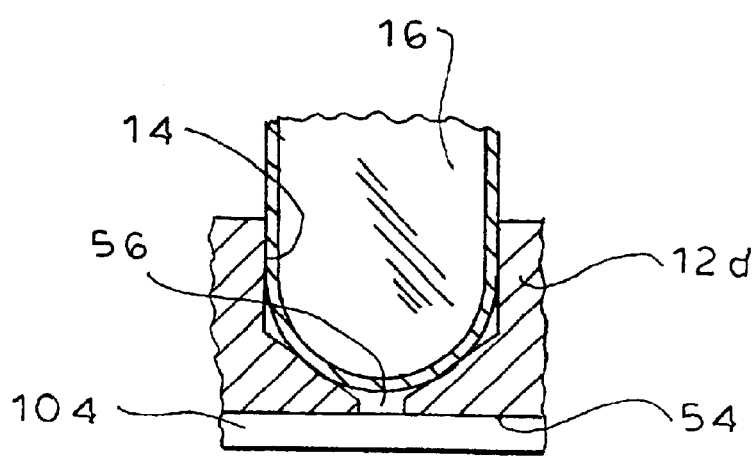
FIG. 11 is a cross-sectional view of a portion of the insert, reaction vessel, recess and conductive plate, taken along line 11—11 of FIG. 8.

FIGS. 9, 10 and 11, illustrate the typical shapes for the recesses 14 for inserts 12b, 12c and 12d, respectively. Recesses 14 in inserts 12b and 12c are shown as conically shaped. Recesses 14 of insert 12d are illustrated as having a semicircular shape.

Forming the vessel receiving recesses with a conical or semi-circular shape increases the surface area of the recess wall which is in direct contact with the vessel to maximize heat transfer. Further, this configuration distributes the weight of the vessel uniformly, permitting the vessels to tolerate a greater load and, at the same time, causes the vessel to "self-center" in the recess. However, conical recesses are preferred as they are easier to form by drilling.

Because the apparatus is designed for use with a magnetic stirrer, it is desirable to seat the vessels as low as possible in the recesses. With this in mind, when drilling conical recesses for larger diameter vessels, the tip of the conical drill bit will pass through the bottom surface 54 of the insert, forming an opening in the bottom of each recess.

For recesses designed to receive smaller (11.6 mm) vessels, an opening 56 in each recess does not inherently result from the recess forming process. However, an opening 56 is nonetheless drilled in the bottom of each recess to permit air trapped between the exterior wall of the vessel and the interior wall of the recess to escape.

The reactor is designed for use with a magnetic stirrer, generally designated E, upon which the reactor rests, as seen in FIGS. 1, 2, 4, 9, 12 and 13. A stir bar 58, as seen in FIG. 9, is provided within each vessel. The stirrer E, as described in detail below, consists of permanent magnets which are rotated relative to the vessels. The rotating magnets create magnetic fields across the vessels, which are themselves rotating, so as to cause bars 58 to rotate within the vessel. The closer the rotating magnets are to the vessel, the stronger the magnetic field which is created within the vessel. Accordingly, the lower the vessel seats within the recess, the stronger the stirring force. With the described configuration, relatively viscous liquids can be stirred.

To provide the best agitation and avoid the possibility of bar 58 becoming wedged between the interior surfaces of the vessel walls, bar 58 is made longer than the inner diameter of the smallest vessel (11.6 mm). The bar will therefore assume a generally upstanding position, as illustrated in FIG. 9. In that position, maximum stirring action is achieved.

Sometimes it is desirable to heat the bottom of the insert vessel while the contents of the vessels are being stirred. This can be accomplished by pumping heated fluid through frame 10, as described above, or by employing a thin, electrically heated plate 60, as seen in FIGS. 2 and 10, interposed between stirrer E and the bottom of base A.

Plate 60 consists of a heat conducting material with an embedded electrical resistance coil 61. Connectors 62, 64 are used to connect the coil to an energy source. Plate 60 is as thin as possible in order to keep the stirrer as close to the vessels as possible.

Stirrer E is illustrated in FIGS. 12 and 13. It consists of a solid body 66 with a top surface 68 and bottom surface 70. A pair of cylindrical recesses 72, 74 are formed in body 66. Situated within each recess 72, 74 is an impeller 76, 78. Each impeller 76, 78 is freely rotatably mounted on an upstanding axle 80, 82 such that it can rotate within the recess in which it is mounted. Each impeller consists of a plurality of slanted fins designed to maximize the rotational force created by gas flow across the recesses.

Within body 66 are situated fluid flow channels including an input channel 84 and an output channel 86. Input channel 84 connects an input port 88 with recesses 72 and 74. Output channel 86 connects an output port 90 with recesses 72 and 74.

A gas under pressure, preferably air, is introduced through port 88 and channel 84 into one side of each recess 72 and 74. It flows through the recesses, rotating the impellers, and then through output channel 86 and port 90. The diameter of the channels is such that an equal amount of air flows through each recess, causing the impellers to rotate at the same rate.

Impeller 76 carries two permanent magnets 92, 94. Similarly, impeller 78 carries two permanent magnets 96, 98. As the impellers rotate, the magnetic field created by the moving magnets cause the stir bars 58 in the reaction vessels to turn, stirring the liquid in the vessels. The magnets are mounted as close as possible to top surface 68 of the stirrer such that the magnetic field applied to the vessels is as uniform and strong as possible.

Magnetic stirrer E is designed for use on a shaker table which has upstanding pins. Stirrer E is provided with a plurality of openings 100 designed to receive the pins so as to align the top and bottom portions of the stirrer.

In certain instances, such as when frame 10 is heated, it may be advisable to insulate the base A from the surface upon which the reactor rests. In order to accomplish this, an insulator pad 102, as seen in FIG. 4, may be utilized. Pad 102 is simply a rectangular sheet of insulating material, cut to approximately the size of module A and attached to the bottom thereof.

Similarly, there may be instances, such as when a circular hot plate is used, when it is advisable to maximize heat conductivity to module A. In those instances, instead of pad 102, a heat conductive sheet 104 is situated between the bottom of the reactor and the hot plate to provide more uniform heating, as seen in FIG. 11. Sheet 104 is made of any heat conducting material, such as metal.

It will now be appreciated that the present invention relates to a modular apparatus for performing parallel chemistry reactions in a plurality of reaction vessels. The apparatus includes a base with temperature control capability. The base has a frame adapted to removably receive one of a number of different configuration interchangeable reaction vessel carrying inserts. Each insert has an array of a different number of different size vessel receiving recesses such that the same reactor can be used with a variety of different number and size vessels. The vessel receiving recesses are positioned so as to align with the preset dispensing locations of a standard automatic liquid handler.

Removal of the insert from the frame is facilitated by inclining the insert walls and the use of outwardly extending lips which prevent the insert from seating too low in the frame. Extraction tools with expandable tips for engaging recesses in the insert can be used to assist in handling of the inserts.

The apparatus is adapted for use with an air driven magnetic stirrer. An electronically heated pad may be interposed between the stirrer and the base.

While only a limited number of preferred embodiments of the present invention have been disclosed herein for purposes of illustration, it is obvious that many variations and modifications could be made thereto. It is intended to cover all of these variations and modifications which fall within the scope of the present invention, as defined by the following claims:

We claim:

1. Apparatus for performing chemistry reactions in a plurality of open-mouthed, closed-bottomed, reaction vessels in conjunction with a liquid handler of the type having a plurality of individual liquid dispensing means arranged in a pattern, said apparatus comprising a base defining an insert-receiving space, means for sealing the mouths of the reaction vessels, said sealing means being mounted above said base, between the reaction vessels and the liquid dispensing means of the liquid handler, and comprising a sealing plate having a plurality of sealable openings, each of said sealable openings being aligned with a different one of the reaction vessels, such that liquid can be dispensed through said sealing plate into the reaction vessels from the liquid dispensing means of the liquid handler, said insert-receiving space being situated in operative registration with the liquid dispensing means of the liquid handler, and in combination therewith, first and second inserts alternatively insertable into said insert-receiving space in said base, means for causing said first and second inserts to be received into said insert-receiving space in only a single orientation, each of said inserts comprising a plurality of individual reaction vessel-receiving recesses arranged in a different array, each of said reaction vessel-receiving recesses in each of said insert recess arrays being aligned with a different one of the liquid dispensing means of the liquid handler when the insert is received in said insert-receiving space in said base.

2. Apparatus for performing chemistry reactions in a plurality of open-mouthed, closed-bottomed, reaction vessels in conjunction with a liquid handler of the type having a plurality of individual liquid dispensing means arranged in a pattern, said apparatus comprising a base defining a generally rectangular insert-receiving space having four rounded corners, each of said insert-receiving space corners having a radius, means for sealing the mouths of the reaction vessels, said sealing means being mounted above said base, between the reaction vessels and the liquid dispensing means of the liquid handler, and comprising a sealing plate having a plurality of sealable openings, each of said sealable openings being aligned with a different one of the reaction vessels, such that liquid can be dispensed through said sealing plate into the reaction vessels from the liquid dispensing means of the liquid handler, said insert-receiving space being situated in operative registration with the liquid dispensing means of the liquid handler, and in combination therewith, first and second inserts alternatively insertable into said insert-receiving space in said base, each of said first and second inserts having a generally rectangular configuration with two pairs of opposite insert corners, each of said insert corners being rounded and having a radius that substantially corresponds the radius of the corresponding insert-receiving space corner, wherein the radius of at least one of said insert corners in one of said pairs of opposite insert corners is different from the radius of the opposite corner in said pair of opposite insert corners, such that the insert can be received in said insert-receiving space in said base in only a single orientation, each of said inserts comprising a plurality of individual reaction vessel-receiving recesses arranged in a different array, each of said reaction vessel-receiving recesses in each of said insert recess arrays being aligned with a different one of the liquid dispensing means of the liquid handler when the insert is received in said insert-receiving space in said base.

3. The apparatus of claim 2 wherein the radius of one insert corner in each pair of opposite insert corners is different from the radius of the opposite insert corner in that pair of opposite insert corners.

4. Apparatus for performing chemistry reactions in a plurality of open-mouthed, closed-bottomed, reaction vessels in conjunction with a liquid handler of the type having a plurality of individual liquid dispensing means arranged in a pattern, said apparatus comprising a base having an exterior wall and an interior wall, said interior wall defining an insert-receiving space in said base, at least a portion of said interior wall being inclined relative to said exterior wall, means for sealing the mouths of the reaction vessels, said sealing means being mounted above said base, between the reaction vessels and the liquid dispensing means of the liquid handler, and comprising a sealing plate having a plurality of sealable openings, each of said sealable openings being aligned with a different one of the reaction vessels, such that liquid can be dispensed through said sealing plate into the reaction vessels from the liquid dispensing means of the liquid handler, said insert-receiving space being situated in operative registration with the liquid dispensing means of the liquid handler, and in combination therewith, first and second inserts alternatively insertable into said insert-receiving space in said base, each of said first and second inserts comprising a sidewall at least a portion of which is inclined, wherein said portion of sidewall is inclined to a degree corresponding to that of said portion of said interior wall of said base, each of said inserts comprising a plurality of individual reaction vessel-receiving recesses arranged in a different array, each of said reaction vessel-receiving recesses in each of said insert recess arrays being aligned with a different one of the liquid dispensing means of the liquid handler when the insert is received in said insert-receiving space in said base.

5. The apparatus of claim 4 wherein each of said first and second inserts comprises a bottom surface and wherein said portion of said sidewall is inclined about one degree from a line perpendicular to said bottom surface.

6. The apparatus of any of claims 1, 2 or 4 wherein each of said first and second inserts comprises a reaction vessel-receiving recess array with a different number of vessel-receiving recesses.

7. The apparatus of any of claims 1, 2 or 4 wherein the vessel-receiving recess array in said first insert comprises recesses of a different size than said recesses in the reaction vessel-receiving recesses in said second insert.

8. The apparatus of any of claims 1, 2 or 4 wherein at least one of said inserts comprises 48 vessel-receiving recesses.

9. The apparatus of claim 8 wherein each of said recesses is adapted to receive a reaction vessel with a 11.6 mm diameter.

10. The apparatus of any of claims 1, 2 or 4 wherein at least one of said inserts comprises 24 vessel-receiving recesses.

11. The apparatus of claim 10 wherein each of said recesses is adapted to receive a reaction vessel with a 17 mm diameter.

12. The apparatus of any of claims 1, 2 or 4 wherein at least one of said inserts comprises 9 vessel-receiving recesses.

13. The apparatus of claim 12 wherein each of said recesses is adapted to receive a reaction vessel with a 24 mm diameter.

14. The apparatus of claim 1 wherein at least one of said inserts comprises 6 vessel-receiving recesses.

15. The apparatus of any of claims 2 or 4 wherein at least one of said inserts comprises 6 vessel-receiving recesses.

16. The apparatus of claim 15 wherein each of said recesses is adapted to receive a reaction vessel with a 34 mm diameter.

17. The apparatus of any of claims 1, 2 or 4 wherein each of said vessel-receiving recesses in each of said inserts comprises a substantially conical portion.

18. The apparatus of any of claims 1, 2 or 4 wherein each of said vessel-receiving recesses in each of said inserts comprises a substantially semi-circular portion.

19. The apparatus of any of claims 1, 2 or 4 wherein each of said vessel-receiving recesses in each of said inserts comprises an opening proximate the bottom of said recess.

20. The apparatus of any of claim 1, 2 or 4 wherein said base comprises a temperature control fluid channel.

21. The apparatus of claim 20 further comprising a temperature control fluid source and means for connecting said source and said channel.

22. The apparatus of claim 21 further comprising a temperature control module adapted to be interposed between said plate and said base.

23. The apparatus of any of claims 1, 2 or 4 wherein said first insert comprises a thermo-couple receiving opening.

24. The apparatus of any of claims 1, 2 or 4 further comprising an insert extraction tool having a protrusion, wherein said first insert comprises a protrusion receiving opening.

25. The apparatus of claim 24 wherein said tool comprises means for changing said protrusion between an expanded sate, to frictionally engage said protrusion receiving opening, and a non-expanded state, to disengage said opening.

26. The apparatus of claim 25 wherein said protrusion is normally in the expanded state.

27. The apparatus of claim 25 wherein said protrusion is normally in the non-expanded state.

28. The apparatus of claim 27 further comprises means for maintaining said protrusion in the non-expanded state.

29. The apparatus of claim 4 wherein said inserts can be inserted into said insert-receiving space in said base in only a single orientation.

30. The apparatus of claim 4 wherein each of said inserts comprises first and second rounded corners, each of said corners having a different radius.

31. The apparatus of claim 30 wherein said insert-receiving space comprises first and second rounded corners, each of said corners of said space having a radius that corresponds to the radius of a different one of said corners of each of said inserts.

32. The apparatus of any of claims 1 or 2 wherein said base comprises a wall defining said insert-receiving space and a bottom surface, said wall being inclined relative to a line perpendicular to said bottom surface of said base by a given amount.

33. The apparatus of any of claims 1 or 2 wherein each of said inserts comprises a side wall and a bottom surface, said side wall being inclined relative to a line perpendicular to said bottom surface of said insert by a given amount.

34. The apparatus of claim 33 wherein the amount of inclination of said wall of said base and the amount of inclination of said side wall of said insert are substantially equal.

35. The apparatus of claim 34 wherein the amount of inclination of said wall of said base and the amount of inclination of said side wall of said insert are each approximately one degree.

36. The apparatus of any of claims 1, 2 or 4 wherein each of said inserts has a side wall with an outwardly extending lip adapted to rest on said base when said insert is received in said space.

37. The apparatus of any of claims 1, 2 or 4 further comprising magnetic stirrer means and a magnetic stirrer bar situated within one of the reaction vessels received in one of the recesses in one of said inserts, said bar being longer than the diameter of the vessel in which said bar is received.

* * * * *